United States Patent
Wu et al.

(10) Patent No.: US 12,537,208 B2
(45) Date of Patent: Jan. 27, 2026

(54) ANODE RECOVERY SYSTEM OF FUEL CELL

(71) Applicant: Asia Hydrogen Energy, Hsinchu County (TW)

(72) Inventors: Bing Yi Wu, Hsinchu County (TW); Feng Hsiang Hsiao, Hsinchu County (TW); Jheng-Yue Dong, Hsinchu County (TW); Ming-Yao Dong, Hsinchu County (TW); Ruei-Jing Lin, Hsinchu County (TW)

(73) Assignee: Asia Hydrogen Energy, Hsinchu County (TW)

( * ) Notice: Subject to any disclaimer, the term of this patent is extended or adjusted under 35 U.S.C. 154(b) by 576 days.

(21) Appl. No.: 18/169,856

(22) Filed: Feb. 15, 2023

(65) Prior Publication Data
US 2023/0261217 A1    Aug. 17, 2023

Related U.S. Application Data

(60) Provisional application No. 63/310,151, filed on Feb. 15, 2022.

(51) Int. Cl.
*H01M 8/04*      (2016.01)
*H01M 8/04082*   (2016.01)
(Continued)

(52) U.S. Cl.
CPC ... *H01M 8/04201* (2013.01); *H01M 8/04097* (2013.01); *H01M 8/04126* (2013.01);
(Continued)

(58) Field of Classification Search
CPC ......... H01M 8/04201; H01M 8/04097; H01M 8/04126; H01M 8/04156; H01M 8/04164;
(Continued)

(56) References Cited

U.S. PATENT DOCUMENTS

| 2008/0113252 A1* | 5/2008 | Yamamoto | H01M 8/0662 429/444 |
| 2013/0202976 A1* | 8/2013 | Chikugo | H01M 8/2485 429/414 |

(Continued)

FOREIGN PATENT DOCUMENTS

KR    20150011065 A  *  1/2015  ........ H01M 8/04164

*Primary Examiner* — James M Erwin
(74) *Attorney, Agent, or Firm* — AVEK IP, LLC

(57) ABSTRACT

Some embodiments of the disclosures provide an anode recovery system of a fuel cell. The anode recovery system includes a gas supply unit connected to a power generation unit, a gas-liquid separator connected to the power generation unit and a first anode gas recovery control component; and a storage tank connected to the gas-liquid separator and a cathode recovery system. The gas supply unit is configured to provide anode gas to the power generation unit. A first part of unreacted anode gas from the power generation unit mixes with the anode gas and flows back to the power generation unit sequentially via the gas-liquid separator and the first anode gas recovery control component. A second part of the unreacted anode gas and generated water are discharged from the power generation unit to the storage tank and is further discharged to the cathode recovery system.

12 Claims, 2 Drawing Sheets

(51) Int. Cl.
*H01M 8/04089* (2016.01)
*H01M 8/04119* (2016.01)
*H01M 8/0438* (2016.01)
*H01M 8/0444* (2016.01)
*H01M 8/04537* (2016.01)
*H01M 8/04746* (2016.01)
*H01M 8/04828* (2016.01)
*H01M 8/10* (2016.01)

(52) U.S. Cl.
CPC ... *H01M 8/04156* (2013.01); *H01M 8/04164* (2013.01); *H01M 8/04395* (2013.01); *H01M 8/04455* (2013.01); *H01M 8/0447* (2013.01); *H01M 8/04582* (2013.01); *H01M 8/04746* (2013.01); *H01M 8/04753* (2013.01); *H01M 8/04783* (2013.01); *H01M 8/04843* (2013.01); *H01M 2008/1095* (2013.01)

(58) Field of Classification Search
CPC ......... H01M 8/04395; H01M 8/04455; H01M 8/0447; H01M 8/04582; H01M 8/04746; H01M 8/04753; H01M 8/04843; H01M 2008/1095
USPC ........................................................ 429/414
See application file for complete search history.

(56) References Cited

U.S. PATENT DOCUMENTS

2018/0123148 A1* 5/2018 Itoga .................. B60L 50/72
2020/0075974 A1* 3/2020 Joos .................. H01M 8/04753

* cited by examiner

ANODE RECOVERY SYSTEM OF FUEL CELL

CROSS REFERENCE TO RELATED APPLICATION

This application claims priority to U.S. provisional application No. 63/310,151, filed on Feb. 15, 2022, the disclosure of which is incorporated by reference herein in its entirety.

FIELD OF THE DISCLOSURE

The disclosure relates generally to the field of fuel cell. More specifically, the disclosure relates to fuel cell systems applied to an environment that do not emit anode reaction hydrogen and fuel cell systems concerned with gas and liquid recovery systems which recycle unreacted anode fuel gas to the cathode reaction.

BACKGROUND

A fuel cell is a device that directly converts the chemical energy of a fuel into electrical energy, also known as an electrochemical generator. In the history of energy development, a fuel cell is the fourth power generation technology after hydropower, thermal power and atomic power.

Compared with hydroelectric power generation and thermal power generation, fuel cells are high-efficiency, clean power sources. Traditional fuel cells use alcohol, natural gas, hydrogen and other materials as fuels, and are directly converted into electrical energy through redox reactions. Its high-efficiency energy conversion rate and relatively low environmental pollution make it the most environmentally friendly and sustainable power generation solution. For example, a hydrogen fuel cell uses hydrogen and oxygen in the air as fuel and oxidant respectively, and only produces water as a by-product. Hydrogen fuel cells usually use a proton exchange membrane (proton exchange membrane) to separate the cathode and anode, thus, it is also called proton exchange membrane fuel cell.

However, in actual applications, in order to generate enough energy for the load, the amount of fuel provided to the fuel cell is usually more than sufficient (for example: excessive amount of hydrogen), and therefore, excessive fuel will remain in the fuel cell. If the above-mentioned fuel is directly removed, it will not only cause waste, take hydrogen as an example, it is more likely to encounter the safety issue in certain special applications (such as: closed environment, vehicle use, etc.). The common reason is that the concentration of hydrogen after discharge accumulates gradually. Hence, how to effectively recover and reuse the excess fuel becomes one of the most important issues.

In order to achieve the recovery and reuse of excess fuel, different mechanism designs are used in the conventional fuel cell systems trying to solve the problem of fuel waste, but most of the conventional fuel cell system designs are difficult to achieve ideal reactions. Thus, regular discharge of hydrogen is still necessary to avoid the safety hazards caused by the accumulation of hydrogen.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides an anode recovery system of a fuel cell. The anode recovery system includes: a gas supply unit connected to a power generation unit, the gas supply unit being configured to provide anode gas to the power generation unit; a gas-liquid separator connected to the power generation unit and a first anode gas recovery control component; and a storage tank connected to the gas-liquid separator and a cathode recovery system.

A first part of unreacted anode gas from the power generation unit mixes with the anode gas and flows back to the power generation unit sequentially via the gas-liquid separator and the first anode gas recovery control component. A second part of the unreacted anode gas and generated water are discharged from the power generation unit to the storage tank and is further discharged to the cathode recovery system. The unreacted anode gas recycles only inside the anode recovery system, the cathode recovery system, and the power generation unit.

Optionally, a buffer tank is set between the gas-liquid separator and the storage tank.

Optionally, a second anode gas recovery control component is set between the gas-liquid separator and the buffer tank.

Optionally, the second anode gas recovery control component is a positive flow controlling component or a passive flow controlling component.

Optionally, the second anode gas recovery control component comprises at least one item selected from the group consisting of flow meter, gas pump, circulation pump, and restrictor valve.

Optionally, as the second anode gas recovery control component is activated, actuation of the first anode gas recovery control component is increased to stabilize anode operation pressure.

Optionally, the buffer tank is pressure-adjustable such that an inner pressure of the buffer tank is between vacuum and 10 psia before the second part of the unreacted anode gas and generated water are discharged to the buffer tank from the gas-liquid separator.

Optionally, the storage tank is pressure-adjustable such that an inner pressure of the storage tank is between vacuum and 10 psia before the second part of the unreacted anode gas and generated water are discharged to the storage tank from the gas-liquid separator.

Optionally, the first anode gas recovery control component is a positive flow-control component or a passive flow-control component.

Optionally, a cathode gas recovery control component is set in the cathode recovery system.

Optionally, a gas concentration sensor is set in the cathode recovery system.

Optionally, the second part of the unreacted anode gas discharged from the gas-liquid separator is discharged to the cathode recovery system, and a concentration of the second part of the unreacted anode gas in the cathode recovery system is not higher than 1%.

In other embodiments, an anode recovery system of fuel cell disclosed in the disclosure is applied to a fuel cell having a power generation unit and a cathode recovery system. The anode recovery system of fuel cell includes a gas supply unit, gas-liquid separator and a storage tank. The gas supply unit is connected to the power generation unit and provides anode gas to the power generation unit. The gas-liquid separator is connected to the power generation unit and at least a first anode gas recovery control component. Unreacted anode gas from the power generation unit is discharged to the gas supply unit for mixing with fresh anode gas and is input to the power generation unit sequentially via the gas-liquid separator and the first anode gas recovery control component. The storage tank is connected to the gas-liquid separator and the cathode recovery system, and rest of unreacted anode gas and generated water discharged to the storage tank and further discharged to the cathode recovery system. In the disclosure, unreacted anode gas may recycle completely inside the anode recovery system, the cathode recovery system and the power generation unit. No anode gas is discharged from the anode recovery system and the cathode recovery system to outside.

An embodiment of the disclosure discloses that at least a second anode gas recovery control component is further set between the gas-liquid separator and the buffer tank. The buffer tank is pressure-adjustable in which inner pressure of the buffer tank is close to vacuum and less than 10 psia before unreacted anode gas and generated water discharged to the buffer tank from the gas-liquid separator.

An embodiment of the disclosure discloses that the storage tank is pressure-adjustable in which inner pressure of the storage tank is close to vacuum and less than 10 psia before unreacted anode gas and generated water discharged to the storage tank from the gas-liquid separator.

An embodiment of the disclosure discloses that a cathode gas recovery control component is further set in the cathode recovery system. The cathode gas recovery control component is exerted to control the flow of cathode gas and anode gas in the cathode recovery system.

An embodiment of the disclosure discloses that unreacted anode gas discharged from the gas-liquid separator is discharged to the cathode recovery system, and concentration of anode gas in the cathode recovery system is not higher than 1%.

An embodiment of the disclosure discloses that the cathode recovery system recovers the unreacted anode gas, and the anode gas is reacted and consumed via the cathode reaction catalyst in the power generation unit.

BRIEF DESCRIPTION OF THE DRAWINGS

Illustrative embodiments of the present disclosure are described in detail below with reference to the attached drawing figures.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

Figure 1:
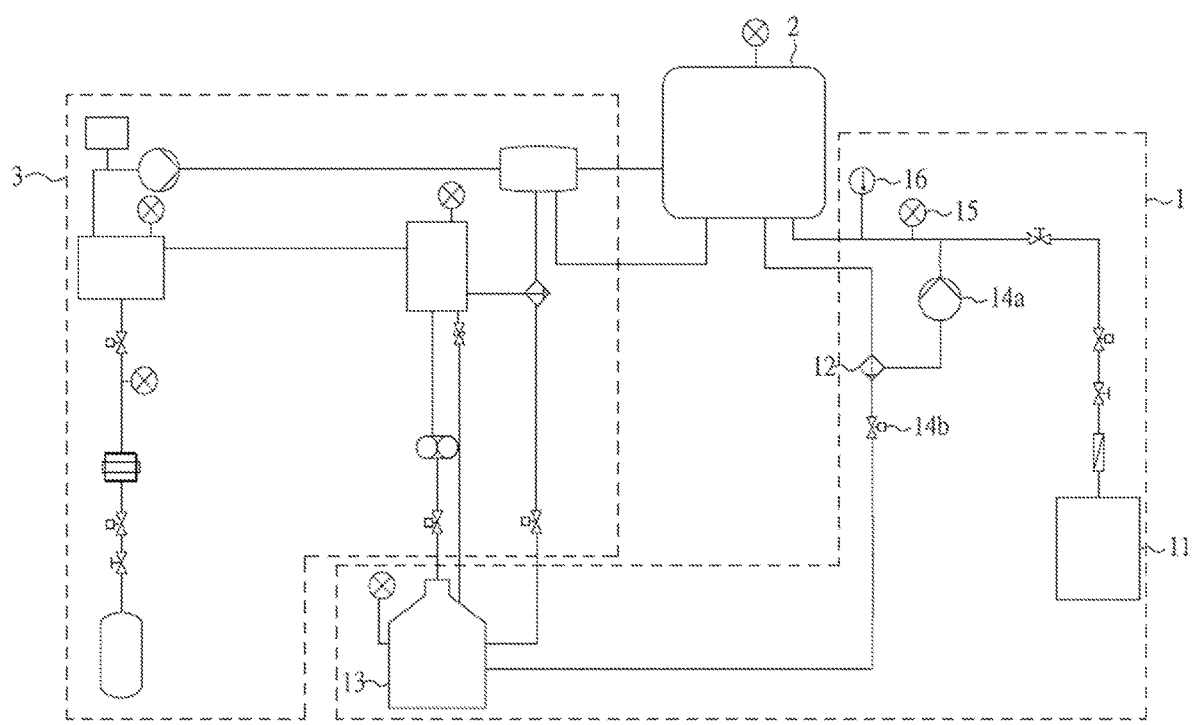
FIG. 1 shows a schematic diagram of the piping configuration of the anode recovery system of the fuel cell according to an embodiment of the disclosure.

As illustrated in FIG. 1, an anode recovery system 1 of fuel cell disclosed in the disclosure, applied to a fuel cell having a power generation unit 2 and a cathode recovery system 3. The anode recovery system 1 of fuel cell includes a gas supply unit 11, gas-liquid separator 12 and a storage tank 13. The gas supply unit 11 is connected to the power generation unit 2 and provides the anode gas to the power generation unit 2. The gas-liquid separator 12 is connected to the power generation unit 2 and at least a first anode gas recovery control component 14a. The unreacted anode gas from the power generation unit 2 is discharged to the gas supply unit 11 for mixing with the fresh anode gas and is input to the power generation unit 2 sequentially via the gas-liquid separator 12 and the first anode gas recovery control component 14a. The storage tank 13 is connected to the gas-liquid separator 12 and the cathode recovery system 3, and the rest of the unreacted anode gas and generated water discharged to the storage tank 13 and further discharged to the cathode recovery system 3. In the disclosure, the unreacted anode gas may recycle completely inside the anode recovery system 1, the cathode recovery system 3 and the power generation unit 2. No anode gas is discharged from the anode recovery system 1 and the cathode recovery system 3 to outside.

In more detail, the anode gas and the cathode gas undergo oxidation-reduction reactions in the power generation unit 2 to produce liquid. Meanwhile, the unreacted anode gas and the unreacted cathode gas remain in the power generation unit 2. Part of the liquid coexists with the unreacted anode gas; part of the liquid coexists with the unreacted cathode gas.

Taking the present embodiment as an example, the first anode gas recovery control component 14a connected to the gas-liquid separator 12 is an anode gas pump (14a). The gas-liquid separator 12 is further connected to a second anode gas recovery control component 14b, and in this embodiment, an electromagnetic valve (14b) is used as an example. The gas-liquid separator 12 is connected between the gas supply unit 11 and the power generation unit 2 via the anode gas pump 14a. The gas-liquid separator 12 is connected to the storage tank 13 via the solenoid valve 14b.

The storage tank 13 is connected to the electromagnetic valve 14b and the cathode recovery system 3 of the gas-liquid separator 12, The gas flow of the rest of the unreacted anode gas and water discharged via the gas-liquid separator 12 is controlled via the electromagnetic valve 14b, so that the unreacted anode gas is discharged to the storage tank 13 under the control of parameters such as pressure and flow rate, and the unreacted anode gas is further discharged to the cathode recovery system 3 via the storage tank 13.

Figure 2:
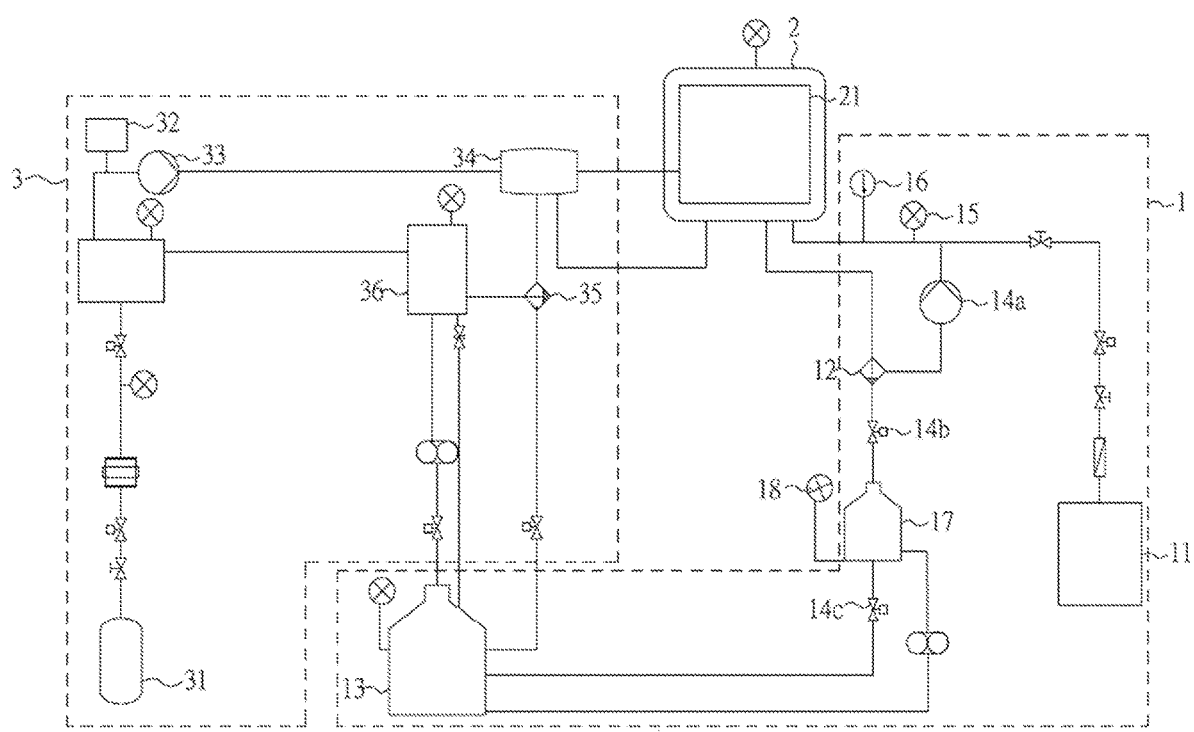
FIG. 2 shows a schematic diagram of the piping configuration of another anode recovery system of the fuel cell according to another embodiment of the disclosure.

Please refer to FIG. 2, a schematic diagram of pipeline configuration of another fuel cell anode recovery system of the disclosure is illustrated. In this embodiment, the anode gas is hydrogen and the cathode gas is oxygen as an example.

In this embodiment, the actual configuration of the gas supply unit 11 is a hydrogen gas storage tank (11), and the actual configuration of the cathode gas storage tank 31 of the cathode recovery system 3 is an oxygen gas tank (31). The cathode recovery system 3 is provided with a cathode gas recovery control component 33, which may be an air pump (33) as an example for illustration.

As the hydrogen storage tank 11 supplies hydrogen to the hydrogen inlet of the proton exchange membrane stack 21 of the power generation unit 2, a hydrogen pressure sensor 15 and a hydrogen temperature sensor 16 are arranged at the front end of the hydrogen inlet. Before the oxygen provided via the oxygen storage tank 31 of the cathode enters the oxygen inlet port of the proton exchange membrane stack 21, the amount of oxygen sent into the proton exchange membrane stack 21 for redox reactions must be ensured that is sufficient. Therefore, in the disclosure, an oxygen concentration sensor 32 is used to detect the oxygen concentration, and the air pump 33 is used to deliver the gas to the humidifier 34.

As the gas from the hydrogen storage tank 11 and the oxygen storage tank 31 all enters into the proton exchange membrane stack 21, water will be produced after the oxidation-reduction reaction. A small amount of unreacted hydrogen and unreacted hydrogen remain inside the proton exchange membrane stack 21. Because that most of the water produced by the redox reaction accumulates at the cathode end, water and unreacted oxygen are directly returned to the humidifier 34 of the cathode at the cathode gas outlet of the proton exchange membrane stack 21. Part of the water is used to humidify the air before entering to the proton exchange membrane stack 21; part of the water and unreacted air is discharged into the cathode gas-liquid separator 35 through the humidifier 34. In this embodiment, the cathode gas-liquid separator 35 is connected to the anode storage tank 13 of the anode recovery system 1.

For the anode recovery system 1, since the cost of hydrogen is higher than that of oxygen, it is very important to improve the efficiency of hydrogen recovery and reuse in the fuel cell system. As shown in FIG. 2, the hydrogen gas outlet of the proton exchange membrane stack 21 discharges the unreacted hydrogen and also small amount of water. Therefore, these small amounts of water and unreacted hydrogen enter the anode gas-liquid separator 12, the gas and liquid are separated due to gravity or other external forces. The hydrogen on the top anode gas-liquid separator 12 may be discharged to the pipeline between the gas supply unit 11 and the proton exchange membrane stack 21 via the anode gas pump 14a. In addition to water, there is a very small amount of unreacted hydrogen that near to the bottom of the anode gas-liquid separator 12. Before these water and unreacted hydrogen enter the storage tank 13, the pressure of the storage tank 13 is lowered in advance. The pressure of the storage tank 13 is lowered to near-vacuum, in which the pressure is not higher than 10 psia.

In this embodiment, between the anode gas-liquid separator 12 and the storage tank 13, a hydrogen storage tank 17 is further provided. Between the hydrogen storage tank 17 and the anode gas-liquid separator, an electromagnetic valve 14b is disposed. A pressure sensor 18 is arranged on the hydrogen storage tank 17 for monitoring the pressure of hydrogen in the hydrogen storage tank 17. Initially, the pressure of the hydrogen storage tank 17 and of the storage tank 13 are both in a vacuum state (the pressure value is not higher than 10 psia). As the unreacted hydrogen and generated water are discharged to the anode gas-liquid separator 12 from the proton exchange membrane stack 21, the electromagnetic valve 14b arranged between the anode gas-liquid separator 12 and the hydrogen storage tank 17 will be opened, and the electromagnetic valve 14c of the hydrogen storage tank 17 will be closed at the same time. Thus, the hydrogen and water from the anode gas-liquid separator 12 may be temporarily stored in the hydrogen storage tank 17. As more and more gas and water are discharged into the hydrogen storage tank 17, the pressure detected via the pressure sensor 18 of the hydrogen storage tank 17 gradually rises. As the pressure is higher than the presetting, the electromagnetic valve 14c arranged between the hydrogen storage tank 17 and the storage tank 13 is activated, and at the same time, electromagnetic valve 14b arranged between the anode gas-liquid separator 12 and the hydrogen storage tank 17 is activated. Again, there is an obvious gas pressure difference between the hydrogen storage tank 17 and the storage tank 13, so that the hydrogen and water temporarily stored in the hydrogen storage tank 17 may be effectively and quickly transported into the storage tank 13. Then, the hydrogen and water is discharged from the storage tank 13 to the buffer tank 36 of the cathode recovery system 3, and finally is discharged to the proton exchange membrane stack 21 of the power generation unit 2 along the pipeline. In the proton exchange membrane stack 21, the hydrogen and water is catalyzed via the cathode catalyst to form water with oxygen, which is further discharged via the drainage mechanism of the fuel cell.

In addition to the above-mentioned effects, the setting of the hydrogen storage tank 17 is further to prevent a large amount of hydrogen from pouring into the storage tank 13. Via controlling the gas pressure in each tank 13 and 17, the hydrogen may be discharged to each tank 13 and 17 batchwisely and in-staged, so as such that too much hydrogen discharged instantaneously to the storage tank 13 and too high hydrogen concentration due to the continuous or amount of hydrogen pouring into the water storage large tank 93 may be avoided. In this embodiment, the pressure control in each tank 13 and 17 is implemented via the electromagnetic valve 14b and 14c so that the hydrogen and water may be discharged to the tank 13 and 17 in batches and stages. Meanwhile, the risk of a large amount of hydrogen being poured into the cathode recovery system 3 due to valve failure may be reduced.

However, as the conventional fuel cell system is performing anode purge, when the electromagnetic valve for anode purge is activated. Thus, the pressure of hydrogen will decrease, and this instantaneous pressure drop may cause the fuel cell system being electrically unstable and also cause severe pressure changes in the proton exchange membrane, which may impact the membrane structure, thereby reducing the life of the power generation unit and increasing the risk of air leakage for the fuel cell system.

In order to solve the bottleneck encountered in the prior art, the hydrogen pump disclosed above will increase the flow of hydrogen at the same time as the rotation speed increases. In the recovery loop, the overall hydrogen operating pressure rises, so the operating pressure of the fuel cell may be maintained within a certain range as the anode purging. In addition, the speed of the hydrogen pump will increase as the anode purging. Hence, the water bound with hydrogen may be removed so that the water accumulated in the fuel cell may be removed to maintain the performance of the fuel cell.

Based on the above, in order to maximize the usage of hydrogen during operation, an anode recovery system is disclosed in the disclosure. The hydrogen recovery loop not only recovers unreacted hydrogen and re-enters the fuel cell system to maximize the efficiency of hydrogen use, but also transports hydrogen into the cathode recovery system at the same time. After the hydrogen discharged to the cathode recovery system, the hydrogen is catalyzed into water. Therefore, during the oxidation-reduction reaction process in a fuel cell system, periodic and regulated exhaust and drainage may be achieved. This may allow for the removal of accumulated impurities in the power generation unit, effectively solving the problem of continuous accumulation of impurities in the circulation structure, and maintaining the hydrogen concentration within the power generation unit. In addition, the water generated during the reaction process of the fuel cell system is also eliminated by periodic hydrogen exhaust, avoiding blockage in the flow channels within the fuel cell.

The disclosure may be effective in connecting the discharge of unreacted anode gas to the gas discharge port of the cathode recovery system, allowing for a significant mixing of anode gas from the anode and unreacted gas from the cathode. In order to ensure the overall power generation efficiency, the concentration of unreacted anode gas imported into the cathode recovery system should not exceed 1%. As a result, some of the unreacted anode gas returns to the power generation unit from the anode recovery system for use as fuel, while a small portion of the unreacted anode gas undergoes an oxidation-reduction reaction through the cathode reaction mechanism to generate liquid before being removed from the fuel cell. This allows for the achievement of zero emissions of anode gas.

Various embodiments of the disclosure may have one or more of the following effects. In some embodiments, according to the disadvantages of the conventional technologies, the present disclosure provides a fuel cell system which may provide a gas and liquid recovery system and connect the anode discharge loop with a vacuum tank. The excessive hydrogen and the generated water discharge to the vacuum tank via the vacuum, and, meanwhile, the hydrogen may be effectively recovered to the cathode loop. The hydrogen concentration inside the cathode may be controlled within a safe range, so that the explosion may be avoided. Both of the safety and power generation efficiency of the fuel cell system may be considered. In other embodiments, an object of the present disclosure may be to provide an anode recovery system of fuel cell that may realize zero discharge of anode gas. In further embodiments, the purpose of the disclosure may be to provide a fuel cell anode recovery system, which may discharge unreacted anode gas to the cathode recovery system to carry out another recycling path. After entering the power generation unit, the unreacted anode gas may react with the cathode gas to generate water under the action of the cathode catalyst. The concentration of the anode gas entering the cathode recovery system may be not higher than 1% for safety issue.

In some embodiments, the disclosure may have the following effects: the discharge of unreacted anode gas may be connected to the gas discharge port of the cathode recovery system, the anode gas may be mixed with the unreacted cathode in a large amount. In order to ensure the overall power generation efficiency, the concentration of unreacted anode gas after entering the cathode circulation system may be not higher than 1%. Therefore, part of the unreacted anode gas may be returned to the power generation unit from the anode recovery system to be used as fuel, and rest of the unreacted anode gas may be turn into a liquid via redox reaction through the cathode reaction mechanism, and then, the liquid may be discharged from the fuel cell. Thus, the goal of zero emission of anode gas may be achieved.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. An anode recovery system of a fuel cell, comprising:
a gas supply unit connected to a power generation unit, the gas supply unit being configured to provide anode gas to the power generation unit;
a gas-liquid separator connected to the power generation unit and a first anode gas recovery control component; and
a storage tank connected to the gas-liquid separator and a cathode recovery system;
wherein:
a first part of unreacted anode gas from the power generation unit mixes with the anode gas and flows back to the power generation unit sequentially via the gas-liquid separator and the first anode gas recovery control component;
a second part of the unreacted anode gas and generated water are discharged from the power generation unit to the storage tank and is further discharged to the cathode recovery system; and
the unreacted anode gas recycles only inside the anode recovery system, the cathode recovery system, and the power generation unit.

2. The anode recovery system of claim 1, wherein a buffer tank is set between the gas-liquid separator and the storage tank.

3. The anode recovery system of claim 2, wherein a second anode gas recovery control component is set between the gas-liquid separator and the buffer tank.

4. The anode recovery system of claim 3, wherein the second anode gas recovery control component is a positive flow controlling component or a passive flow controlling component.

5. The anode recovery system of claim 3, wherein the second anode gas recovery control component comprises at least one item selected from the group consisting of flow meter, gas pump, circulation pump, and restrictor valve.

6. The anode recovery system of claim 3, wherein, as the second anode gas recovery control component is activated, actuation of the first anode gas recovery control component is increased to stabilize anode operation pressure.

7. The anode recovery system of claim 2, wherein the buffer tank is pressure-adjustable such that an inner pressure of the buffer tank is between vacuum and 10 psia before the second part of the unreacted anode gas and generated water are discharged to the buffer tank from the gas-liquid separator.

8. The anode recovery system of claim 1, wherein the storage tank is pressure-adjustable such that an inner pressure of the storage tank is between vacuum and 10 psia before the second part of the unreacted anode gas and generated water are discharged to the storage tank from the gas-liquid separator.

9. The anode recovery system of claim 1, wherein the first anode gas recovery control component is a positive flow-control component or a passive flow-control component.

10. The anode recovery system of claim 1, wherein a cathode gas recovery control component is set in the cathode recovery system.

11. The anode recovery system of claim 1, wherein a gas concentration sensor is set in the cathode recovery system.

12. The anode recovery system of claim 1, wherein:
the second part of the unreacted anode gas discharged from the gas-liquid separator is discharged to the cathode recovery system; and a concentration of the second part of the unreacted anode gas in the cathode recovery system is not higher than 1%.

\* \* \* \* \*